E. J. MYERS.
GATE.
APPLICATION FILED APR. 8, 1910.
963,624.
Patented July 5, 1910.
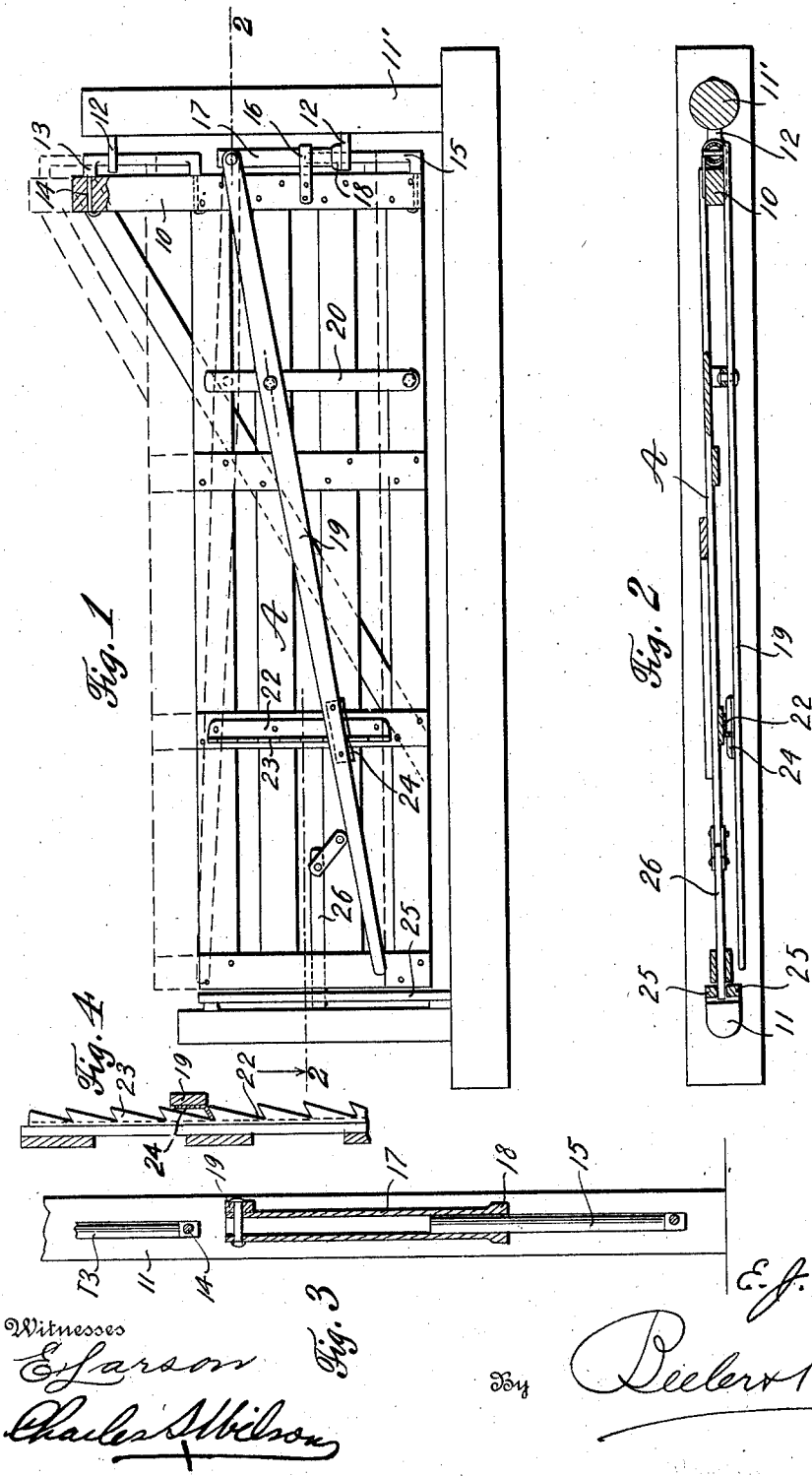

UNITED STATES PATENT OFFICE.

EDGAR J. MYERS, OF PRAIRIE DU SAC, WISCONSIN.

GATE.

963,624.          Specification of Letters Patent.      Patented July 5, 1910.

Application filed April 8, 1910. Serial No. 554,223.

*To all whom it may concern:*

Be it known that I, EDGAR J. MYERS, a citizen of the United States, residing at Prairie du Sac, in the county of Sauk and State of Wisconsin, have invented certain new and useful Improvements in Gates, of which the following is a specification.

This invention relates to farm gates and is designed particularly to construct a gate of this nature wherein the same may be raised so that it may be swung over snow drifts and the like, also to permit hogs and small animals to pass thereunder, retaining the larger animals within the closure.

It also contemplates the construction of a gate wherein the means of raising the same is firm and secure, a guide being provided whereby the raising elements at all times form a hinge.

With the above and other objects in view, this invention consists of the construction, combination and arrangement of parts all as hereinafter more fully described, claimed and illustrated in the accompanying drawings, wherein:

Figure 1 is a side elevation partly in section of a gate constructed in accordance with the present invention; Fig. 2 is a section taken along line 2—2 of Fig. 1; Fig. 3 is an elevation partly in section of the hinges, illustrating the specific construction thereof; Fig. 4 is a section taken through the gate illustrating the teeth carried thereby adapted to retain the operating lever in various positions.

Referring more particularly to the drawings, A indicates in general a gate constructed after the conventional manner, having at one extremity thereof the vertical extension 10, said gate being adapted to swing between the posts 11 and 11′, the post 11′ being constructed to correspond with the extension 10.

A pair of superposed registering eyes 12 are carried on the inner side of the post 11′ and form a means whereby the gate is pivoted to said post. A U-shaped guide 13 is secured by the bolts 14 to the extension 10 and is engaged by the upper eye 12, thereby providing the upper hinge and permitting the reciprocation of the gate with respect to said hinge. An L-guide 15 is secured to the end of the gate below the guide 13 and projects through the lower eye 12, thereby forming the lower hinge which likewise permits the reciprocation of the gate with respect to said hinge.

A sleeve 16 is carried by the gate between the guides 13 and 14 and provides a means whereby a tubular member 17 may be reciprocatingly carried by said gate, said tubular member reciprocating over the upper extremity of the L-guide 15 and having an enlarged portion 18 which is adapted to bear against the lower eye 12, thereby raising the gate as hereinafter more fully described.

A lever 19 is pivoted to the gate through the instrumentality of the link 20, said lever being pivoted to the upper extremity of the tubular member 17. Thus it will be seen that by exerting a pull on the work arm of the lever, the enlarged portion 18 of the tubular member 17 will be brought to bear against the lower eye 12, thus raising the gate through the instrumentality of the link 20.

In order to provide a means whereby the gate may be retained at various heights, an angle bar 22 is secured to the gate, said angle bar having a plurality of teeth 23 formed in the projecting arm thereof. An obliquely bent plate 24 is secured on the inner side of the lever 19 and is adapted to engage any of said teeth, thus retaining the lever in any position on the gate and thereby elevating the gate and retaining the same in any desired position.

A pair of spaced parallel bars 25 are secured to the inner side of the post 11 between which the swing catch 26 is engaged, consequently permitting the vertical movement of the gate when the same is locked.

Having thus described my invention, what is claimed as new is:

1. In a device of the class described, the combination with a plurality of gate posts, of a gate pivotally interposed between said gate posts, one of said gate posts being provided with an extension to correspond with a similar extension on the gate, a plurality of superposed eyes carried by said elongated post, guides carried by the gate adapted to coöperate with said eyes, and a tubular member adapted to engage one of said guides and bear against one of said eyes.

2. In a device of the class described, the combination with a plurality of gate posts, of a gate pivotally interposed between said gate posts, one of said gate posts being provided with an extension to correspond with a similar extension on the gate, a plurality of superposed eyes carried by said elongated post, a U-shaped guide carried by the extension on the gate adapted to be engaged by
5 the upper of said eyes, an L-shaped guide carried by the gate and reciprocating in the lower of said guides, a sleeve reciprocatingly carried by said gate adapted to engage said L-shaped guide and bear against the lower of said eyes, and a lever 10 adapted to operate said tubular member, thereby raising the gate.

In testimony whereof I affix my signature in presence of two witnesses.

EDGAR J. MYERS.

Witnesses:
  J. G. ENNIS,
  A. W. METZ.